United States Patent [19]

Ovaska

[11] Patent Number: 4,797,675
[45] Date of Patent: Jan. 10, 1989

[54] PROCEDURE FOR COUNTING MOVING OBJECTS AS THEY STOP

[75] Inventor: Seppo Ovaska, Hyvinkää, Finland

[73] Assignee: Elevator GmbH, Baar, Switzerland

[21] Appl. No.: 41,633

[22] Filed: Apr. 23, 1987

Related U.S. Application Data

[63] Continuation of Ser. No. 740,302, Jun. 5, 1985, abandoned, which is a continuation of Ser. No. 555,479, Nov. 28, 1983, abandoned, which is a continuation of Ser. No. 246,624, Mar. 23, 1981, abandoned.

[30] Foreign Application Priority Data

Mar. 27, 1980 [FI] Finland .................................. 800954

[51] Int. Cl.$^4$ ............................................. G01S 13/56
[52] U.S. Cl. ....................................... 342/28; 187/132
[58] Field of Search ................... 342/27, 28; 187/130, 187/131, 132

[56] References Cited

U.S. PATENT DOCUMENTS

| | | | |
|---|---|---|---|
| 3,634,884 | 1/1972 | Ross | 342/28 |
| 3,803,599 | 4/1974 | McLean et al. | 342/28 X |
| 3,882,495 | 5/1975 | Bolger | 342/27 X |
| 4,112,419 | 9/1978 | Kinoshita et al. | 187/131 X |
| 4,287,579 | 9/1981 | Inoue et al. | 342/28 X |

Primary Examiner—T. H. Tubbesing
Attorney, Agent, or Firm—Martin Smolowitz

[57] ABSTRACT

This disclosure concerns a procedure for counting the number of stopping objects, such as persons who are coming to wait for an elevator or equivalent. The movements and stopping of the objects are followed by the aid of at least one Doppler radar, whose output signal amplitude changes are used to identify the change of velocity of the objects. The number of objects stopping is claculated from the magnitude of the amplitude changes and/or from the number of Doppler radar pulses recorded.

13 Claims, 2 Drawing Sheets

PROCEDURE FOR COUNTING MOVING OBJECTS AS THEY STOP

This application is a continuation, of application Ser. No. 740,302, filed June 5, 1985, now abandoned which is a continuation of Ser. No. 555,479 filed Nov. 28, 1983, which is a continuation of Ser. No. 246,624 filed Mar. 23, 1981, now abandoned.

BACKGROUND OF THE INVENTION

The present invention concerns a procedure for counting the number of objects which stop on a spot, such as persons who arrive to wait for an elevator or equivalent.

The counting of stopping objects, such as persons waiting for an elevator, is generally accomplished by using e.g. various kinds of contact mats or counters based on the interruption of a light beam.

A contact mat is composed of small switches which close when a person steps on the mat. The information derived from the output of the mat as to how many switchs are closed may be indicated, for instance, by a change of resistance. The number of persons standing on the mat is then proportional to the number of switching elements which have been depressed. The drawback associated with contact mats, apart from their poor mechanical durability in constant use, is also the low reliability of the information furnished by them in elevator lobbies where people may pass through. Another problem is the architecturally objectionable appearance of these mats. Furthermore, the mats command such a high price that in large elevator lobbies the additional cost involved is undesirably high.

Counters, operating on the principle of light beam interruption, allow determination of the number of times the beam has been interrupted. Therefore a means of this type often affords sufficient accuracy in those elevator lobbies which can be accessed from one direction only. However, it is a prerequisite of reliable operation that all those persons who interrupt the beam remain in the elevator lobby. A major 2. drawback hampering photocell counters, similarly as with contact mats, is that passers-through cannot be reliably distinguished from those who stay in the elevator lobby.

It is accordingly an object of the present invention to eliminate these drawbacks and to provide a new type of procedure for counting moving objects as they slow down and stop on a spot. The procedure is reliable in service and well suited for use in various kinds of elevator lobbies for counting the number of people stopping to wait for an elevator.

SUMMARY OF THE INVENTION

These and other objects of the invention are accomplished in accordance with the principles of the present invention by providing the space to be monitored with at least one Doppler radar to register the movements and stopping of the objects. The radar output signal amplitude changes are used to identify the change of velocity of the objects, while the number of objects stopping is calculated from the magnitude of the output signal amplitude changes and/or from the number of recorded radar pulses produced.

The procedure according to this invention has the advantage that it is possible with its aid to reliably measure the number of persons waiting for an elevator in various types of elevator lobby, and that it may also well be applied in lobbies with traffic passing through. Moreover, it is easy to accommodate in the elevator lobby the small number of sensors implied by the procedure and there will be no architecturally disfiguring installations in the lobby. Furthermore, the cost arising from the procedure is reasonable, considering the advantage thus gained, in particular the advantage of more efficient group control of the elevators. A further advantage is the fact that the means applying the procedure contains no mechanically moving parts whatsoever, which would be subject to wear in prolonged use.

An advantageous embodiment of the invention is characterized in that the frequency band received from one or several Doppler radars is divided into narrow frequency bands to represent different velocity ranges of the moving objects. This offers the advantage that it is possible to disregard persons walking at a normal pace and to concentrate on monitoring those only who slow down or completely stop. The procedure may also be successfully applied in elevator lobbies carrying transit traffic.

Another embodiment of the invention is characterized in that the signal amplitude information, measured from the Doppler radar, is corrected, so as to become independent of the object/radar distance, by approximating the amplitude response of the radar by a family of exponential curves. The advantage is then gained that better accuracy is achieved and objects can be more reliably distinguished from each other.

BRIEF DESCRIPTION OF THE DRAWINGS

The invention is described in detail in the following by the aid of an example, reference being made to the drawings attached, wherein.

DETAILED DESCRIPTION OF THE DRAWINGS

Figure 1:
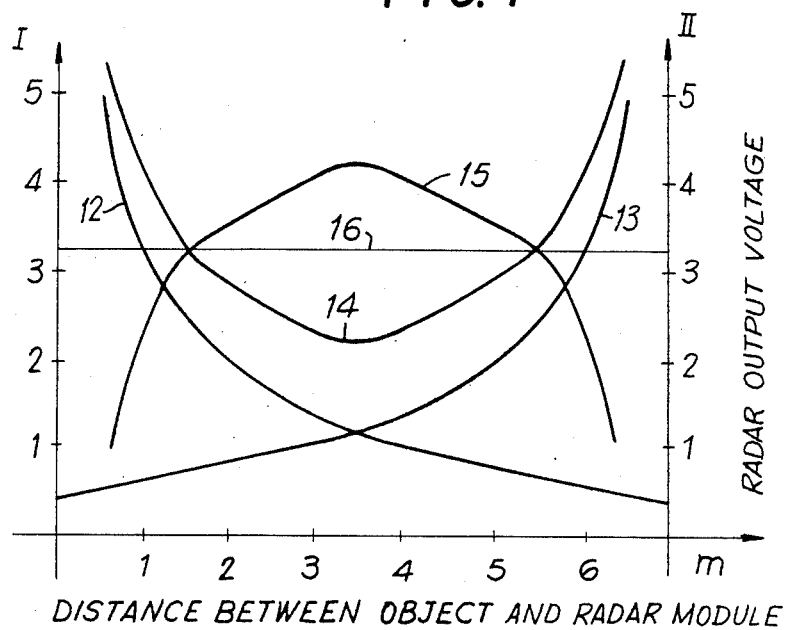
FIG. 1 presents a graphical illustration of the method of correcting the output signal amplitude information to be independent of the object/radar distance by using two Doppler radars.

In the procedure, use is made of at least one, but preferably two, Doppler radars operating in the ultrasonic or microwave range; the Doppler signal therefrom obtained being filtered so as to provide at least one frequency band corresponding to a given velocity range. Furthermore, the nonlinear dependence of the amplitude responses of the radars, as a function of distance, is eliminated in the procedure. To eliminate the dependence a minimum of two radars is needed; FIG. 1 illustrates the correction method for radar modules No. I and II.

Figure 2:
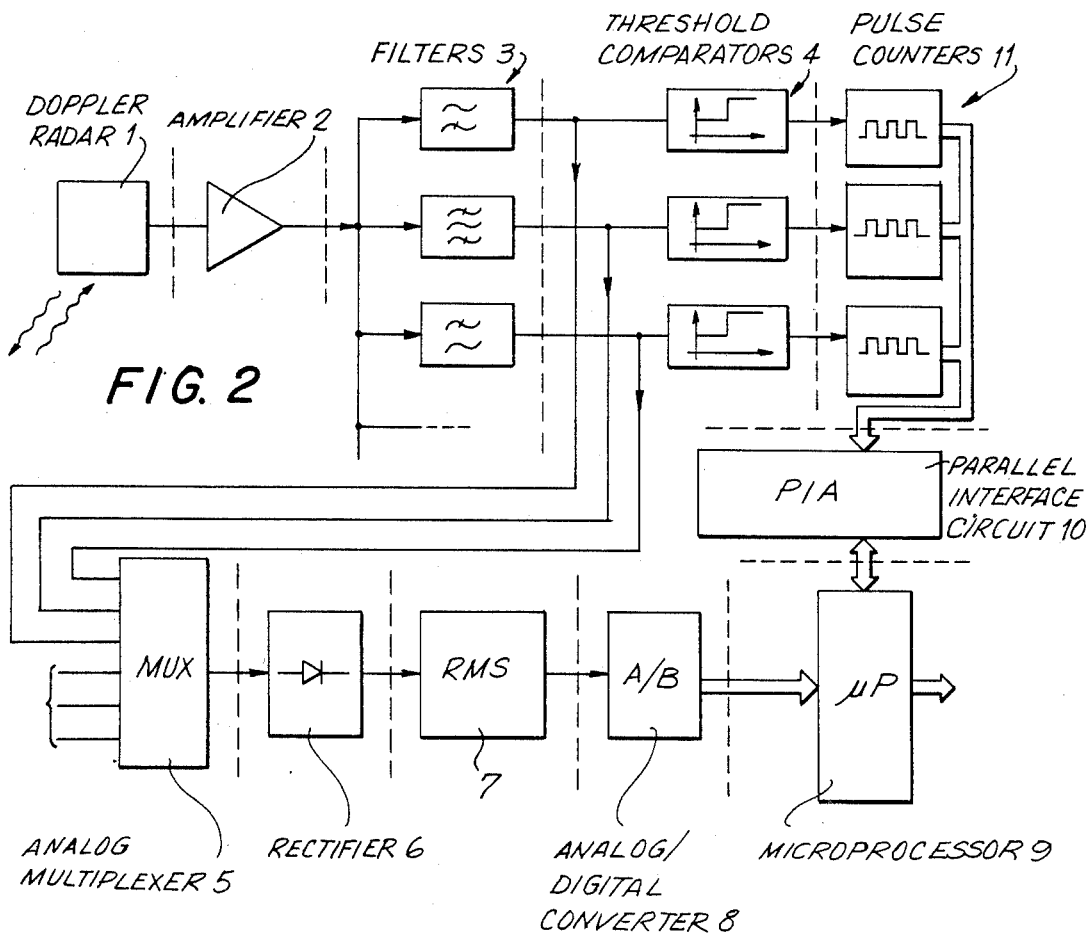
FIG. 2 presents, in the form of a block diagram, an apparatus set-up for applying the procedure of the invention using one Doppler radar.
Figure 3:
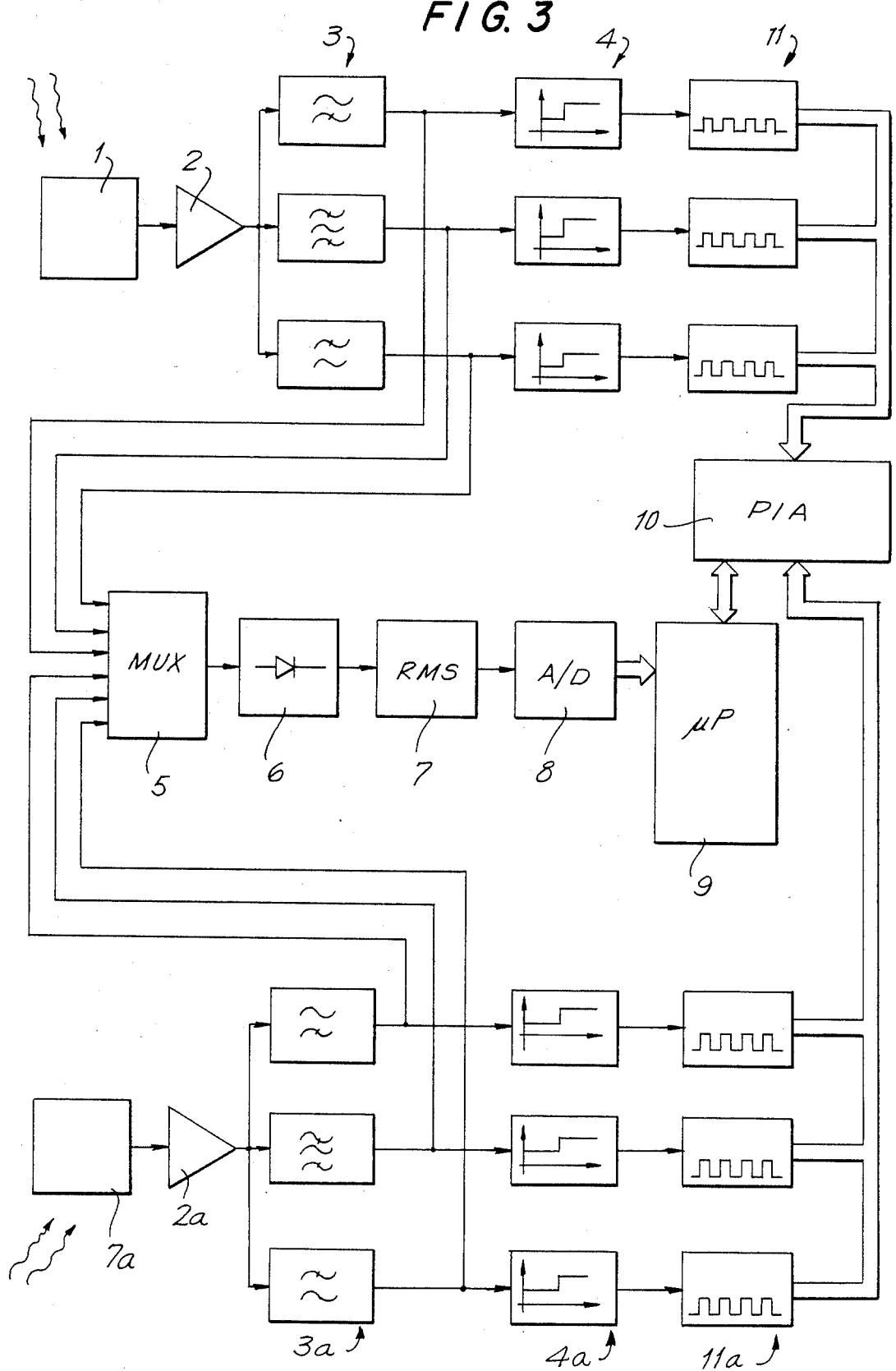
FIG. 3 presents a block diagram of an alternative system using two interconnected Dopple radar modules in accordance with the invention.

As shown in FIG. 2, the output signal from the Doppler radar 1 is amplified in the amplifier 2 and applied to the filters 3, of which there is one at least. The bandlimited continuous signals obtained from the filters are applied to threshold comparators 4, which modulate the positive half-cycles of the signal into pulses; the number of pulses in a time interval is proportional to the distance travelled by the object in the time interval. More specifically, the threshold comparators 4 function to modify the positive peaks of the bandlimited continuous voltage signals produced from the Doppler radar 1 so as to form or provide separate positive voltage pulses, the number of pulses in a time interval thus generated being proportional to the distance travelled by the object in that time interval. The signals from the filters 3 are conducted over an analog multiplexer 5 to a rectifier 6. The rectified signal is applied to a circuit 7 which computes the root mean square (R.M.S.) value of the signal. The R.M.S. value is read into the microcomputer 9 over an analog/digital converter 8. The microcomputer can, via the parallel interface circuit 10, read the pulse counters 11 which count the pulses derived from the threshold comparators 4. The microcomputer may, as required, repeatedly start and stop the pulse counters 11, depending on the movement of the objects. In addition, it may in the analog multiplexer 5 select that channel for which it wishes to measure the Doppler signal R.M.S. value. A second Doppler radar unit can be connected to the basic system as shown in FIG. 3.

With further regard to the operation of the microcomputer 9, it performs the following functions:

(1) it measures the R.M.S. values of the output signals of the two Doppler radars I and II with the A/D converter 8.

(2) it controls the analog multiplexer 5, with which one of the following channels to be measured is selected:

0: radar I, 'people standing still'
1: radar I, 'people slowing down'
2: radar I, 'people walking'
3: radar II, 'people standing still'
4: radar II, 'people slowing down'
5: radar II, 'people walking'

The microcomputer thus addresses the desired channel by a number 0–5.

(3) it commands the parallel interface adapter circuit 10 to start and stop the different pulse counters 11, associated with the different velocity ranges;

(4) it performs the calculations required to correct the signal amplitude values, measured from the Doppler radars, to be independent of the distance between the object and the radar modules, as shown in FIG. 1.

(5) it analyzes the radar amplitude and pulse data and, on the basis of this information, calculates an estimate of the number of people who have stopped in the lobby;

(6) it communicates with the control system of the elevator group, e.g. through a serial data channel;

(7) it sends information on the number of people waiting to the elevator group control system, upon request from the latter; and (8) it receives from the elevator group control system the data concerning the number of people that entered and that came out from the elevator and uses this information to update its own data about the number of people in the lobby;

The filters 3 are used to divide the Doppler frequency from the amplifier 2 into bands; this may be accomplished as follows, for instance. The velocity of walking persons is $>0.35$ m/s, that of persons slowing down is $>0.15$ m/s but $<0.25$ m/s, and that of persons standing on a spot is $<0.07$ m/s.

Relationship between the object velocity and the Doppler frequency

| Velocity range | Frequency/Hz | Velocity/m/s |
| --- | --- | --- |
| Walking persons | $>26$ | $>0.39$ |
| Persons slowing down | 9 ... 16 | 0.14 ... 0.24 |
| Persons standing still | $<4.5$ | $<0.07$ |

The apparatus just described uses the number of pulses and the voltage R.M.S. values to distinguish and count the occurrences of stopping objects, such as persons who slow down and stop to wait for an elevator.

In order to make the measured Doppler signal R.M.S. values independent of the distance between the object and the radar module, the radar output amplitude response is rendered independent of this distance. This can be accomplished, for instance, by deploying a radar at both ends of the space to be monitored. The second Doppler radar module 1a and its associated amplifier 2a and filters 3a are connected to the analog multiplexer 5 in a manner essentially identical as for Doppler radar module 1. Also, for the second radar module 1a as shown in FIG. 3, its associated compartors 4a and pulse counters 11a are connected to the parallel interface circuit 10 identically as for Doppler radar module 1. The output signal amplitude response of each radar module is determined empirically. The equation for the amplitude response has the form $$y = ae^{bx}$$

y = amplitude from the radar
x = object/radar distance
a,b = specific parameters of the radar module The parameters a and b may be determined by measuring the radar signal amplitude response as a function of distance for persons of various sizes; these measurements may be used to calculate, via exponential regression analysis, those parameters which yield the best fit to the measured signal amplitude response. It is possible to compensate for the statistical dispersion of the body area of human persons by selecting various sized persons to serve as experimental subjects and by calculating the weighted mean of the amplitude responses elicited with them.

Having determined the parameters for a single object for each radar module, a family of curves $y = k\,ae^{bx}$ may be determined. Each curve in the family corresponds to a different number, k, of objects. The summed radar amplitude responses can now be made independent of distance by determining the location of the object(s). The location is determined by simultaneously solving the equations $$y_1 = ka\,e^{bx}$$

$$y_2 = ka\,e^{b(d-x)}$$

for the location x and the number of objects k where d is the distance between the radar modules. The correction to the amplitude response is then given by $$h = kc - k\,(ae^{bx} + ae^{b(d-x)})$$

for some conveniently chosen system constant c. The corrected response is then $(y_1 + y_2 + h)/2$.

In FIG. 1, the vertical axis represents the radar output signal R.M.S. voltage. On the left is the output voltage of radar No. I and on the right the output voltage of radar No. II. The horizontal axis represents the object location between the two radars.

The curves 12 and 13 are the output signal amplitude responses ($y_1$ and $y_2$) of radars No. I and II, as functions of location x.

Curve 14 is the sum of the amplitude responses of radars No. I and II.

Curve 15 is the correction applied to the sum of the signal amplitude responses (h).

The straight line 16 is the corrected sum of the amplitude responses.

The microcomputer may observe the occurrence of a person slowing down and stopping e.g. by monitoring the R.M.S. value of the filtered radar signal which corresponds to the slowing down velocity range until it perceives a distinct rise in the distance corrected R.M.S. signal.

To sample any R.M.S. signal one must first select the signal then wait several milliseconds before sampling the R.M.S. output. Two successive such samplings are sufficiently fast to be considered essentially simultaneous.

At this moment it starts the counter which counts the Doppler pulses resulting from the thresholded signal in the slowing down velocity range. At this same time, the distance corrected R.M.S. amplitude of the walking velocity range (>0.35 m/s) is sampled and recorded. As the slowing down continues, the microcomputer reads the distance corrected R.M.S. amplitude of the slowing down velocity range until it distinctly diminishes. At this moment, the pulse counter is stopped and the walking velocity range distance corrected R.M.S. amplitude is once again sampled and recorded. If the duration of the time interval between amplitude changes in the slowing down velocity range was long enough (about 0.5 s), a slowing down has obviously taken place. This can be verified by calculating the difference of the walking velocity range distance corrected R.M.S. amplitudes before and after the slowing down. If the difference is large enough (the number of objects has been reduced by at least one), three estimates are calculated for the number of those who have slowed down. The first estimate is based on the difference of the walking velocity range R.M.S. amplitudes before and after the slowing down. To obtain the second estimate, the number of pulses counted in the slowing down velocity range is divided by the empirically determined number of pulses for one slowing down object. To obtain the third estimate, the number of slowing down objects is calculated from the integrated distance corrected R.M.S. amplitude of the slowing down velocity range. The integration is performed during the slowing down. The weighted mean of these estimates represents the number of persons who have stopped. The total number of persons waiting for an elevator is found by summing the numbers of all instances of stopping.

The elevator group control supplies information to the microcomputer 9 about the number of people who have entered the elevators. The microcomputer uses this information to keep an accurate count of the number of persons in the lobby.

We claim:

1. A procedure for counting moving objects as they slow and stop, comprising the steps of:
    monitoring the movements and stopping of the objects, by use of at least one Doppler radar module directed at the objects and which provides an output signal;
    identifying changes of velocity of the objects by said radar output signal R.M.S. amplitude changes and Doppler radar signal pulses derived from said radar output signal; and
    calculating the number of objects slowing and stopping after said velocity changes occur from the magnitude of the radar output signal R.M.S. amplitude changes taking place during slow-down of the objects and from the number of Doppler radar pulses recorded.

2. A procedure for counting objects according to claim 1, including dividing the radar output signal frequency band obtained from said Doppler radar to be consistent with and represent different velocity ranges of the moving objects.

3. A procedure for counting objects according to claim 2, including dividing the radar output frequency band into three narrower frequency ranges to represent different object moving velocities, said velocities being greater than about 0.35 meter/second, between about 0.15 and 0.25 meter/second, and less than about 0.07 meter/second.

4. A procedure for counting objects according to claim 1, including correcting the output signal amplitude information measured from said Doppler radar to make it independent of the distance between the objects and said radar, by approximating the amplitude response of the radar output signal by using a family of exponential curves.

5. A procedure for counting objects according to claim 4, including employing two Doppler radar modules, each being disposed at one end of a space being monitored, and wherein the output signal R.M.S. amplitude response of each radar module is determined by a microprocessor summing the amplitude for each radar module which is based on the distance of the object from each radar module by a microprocessor.

6. A procedure for counting objects according to claim 1, including monitoring the movement of said objects by two Doppler radar modules, each of said radar modules being disposed at opposite ends of a space within which the movements of the objects are being monitored.

7. A procedure for counting moving and stopping objects, comprising the steps of:
    monitoring the movements and stopping of the objects by using two Doppler radar modules each oriented towards the objects and which each provides an output signal, whereby amplitude changes in each radar output signal are used to identify velocity changes of the moving objects;
    dividing the radar output signal frequency band obtained from each said Doppler radar module to provide frequency bands consistent with the different velocity ranges of the moving objects; and
    calculating the number of objects slowing and stopping after their velocity changes in response to variations in the signal R.M.S. amplitude which occur during slowing down of the objects and from the number of Doppler radar pulses recorded.

8. A procedure for counting objects according to claim 7, including dividing the frequency band so as to distinguish and count three object velocities, said velocities being greater than about 0.35 meter/second, between about 0.15 and 0.25 meter/second, and less than about 0.07 meter/second.

9. A procedure for counting the number of persons stopping to wait for an elevator, including the steps of:
    monitoring the movements and stopping of the persons by using two Doppler radar modules, each disposed at one end of a space being monitored and each being oriented towards the persons therein, whereby amplitude changes in each radar output signal are used to identify velocity changes of the persons moving within the space; dividing the output signal frequency band obtained from each Doppler radar module to provide frequency bands consistent with three velocities of the objects, said velocities being greater than about 0.35 meter/second, between about 0.15 and 0.25 meter/second, and less than about 0.07 meter/second; and calculating the number of persons slowing and stopping after their velocity changes in response to variations in the radar output signal R.M.S. amplitude which occurs during slowing down of the persons within the space.

10. A procedure for monitoring the movement and stopping of objects within a space, comprising the steps of:

monitoring the movements and stopping of said objects by the use of at least one Doppler radar module directed at the space, whereby changes in the output signal R.M.S. amplitude from said radar module are used to identify changes in velocity of the moving objects therein;

modulating the radar output signal into electrical pulses, the number of which pulses being proportional to the distance travelled by the object; and calculating the number of objects stopping within the space after said velocity changes occur from the output signal R.M.S. amplitude changes and the number of pulses which have occurred during the slowing down of the object.

11. A procedure for monitoring the movement of objects according to claim 10, including correcting the output signal R.M.S. amplitude measured by said Doppler radar so as to become independent of distance by using two Doppler radar modules, each of said radar modules being disposed at opposite ends of said space.

12. A procedure for monitoring the movements of objects according to claim 11, including dividing the output frequency band from each radar module so as to distinguish and count three velocity ranges, said velocities being greater than about 0.35 meter/second, between about 0.15 and 0.25 meter/second, and less than about 0.07 meter/second.

13. A procedure for monitoring the movement and stopping of persons within a space, comprising the steps of:

monitoring the movements and stopping of the persons by use of two Doppler radar modules each directed at the space, whereby the changes in output signal R.M.S. amplitude from each radar module are used to identify changes in velocity of the persons moving in the space;

dividing the output signal from each said radar module to provide frequency bands selected to distinguish and count three velocities of the persons, said velocities being greater than about 0.35 meter/second, between about 0.15 and 0.25 meter/second, and less than about 0.07 meter/second;

modulating the radar output signal into electrical pulses for which the number is proportional to the distance traveled by the persons moving within the space; and calculating the number of persons stopping within the space after said velocity changes occur from the output signal R.M.S. amplitude changes and the number of pulses which have occurred during the slowing down of the persons.

* * * * *